D. A. A. BUCK.
Watch.

No. 204,000.

4 Sheets—Sheet 1.

Patented May 21, 1878.

WITNESSES:
Jas. O. Hutchinson
Henry C. Hazard.

INVENTOR.
D. Azro A. Buck, by
Prindle and Co., his Attys.

D. A. A. BUCK.
Watch.

No. 204,000. Patented May 21, 1878.

Witnesses:
Jas. E. Hutchinson
Henry C. Hazard

Inventor-
D. Azro A. Buck. by
Prindle & Co. his Attys

4 Sheets—Sheet 3

D. A. A. BUCK.
Watch.

No. 204,000. Patented May 21, 1878.

WITNESSES
Jas. E. Hutchinson
Henry C. Hazard

INVENTOR.
D. Azro A. Buck, by
Prindle and Co. his Atty.

4 Sheets—Sheet 4.
D. A. A. BUCK.
Watch.
No. 204,000. Patented May 21, 1878.
Fig. 12.
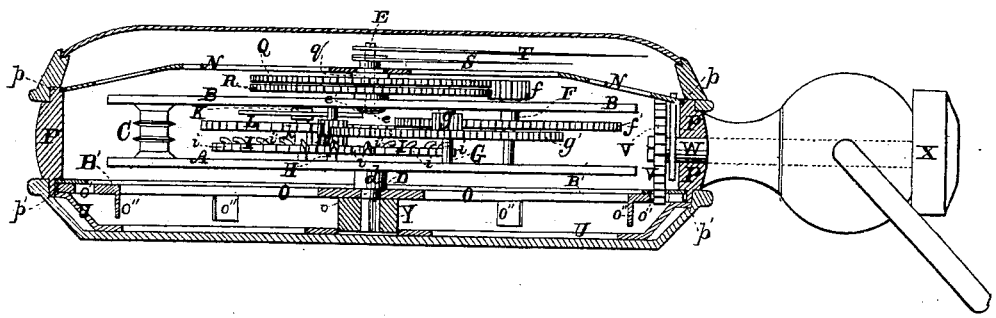
Fig. 13. Fig. 14.
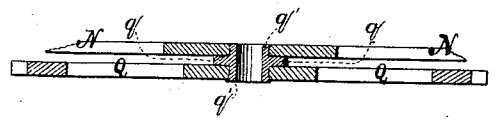 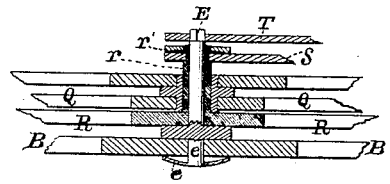
Fig. 15.
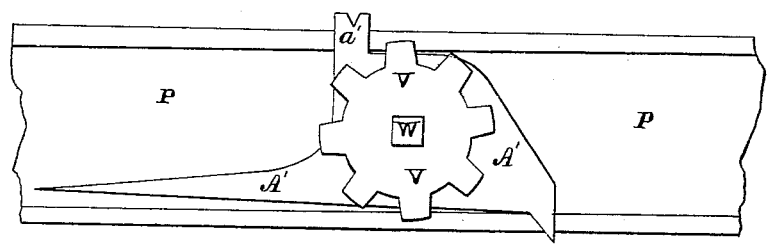
Fig. 16.
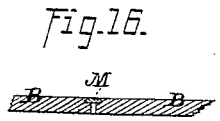
WITNESSES:
Jas. E. Hutchinson
Henry C. Hazard
INVENTOR
D. Azro A. Buck, by
Prindle and Co his Attys

UNITED STATES PATENT OFFICE.

D. AZRO A. BUCK, OF WORCESTER, ASSIGNOR TO HIMSELF AND EDWARD A. LOCKE, OF BOSTON, MASSACHUSETTS.

IMPROVEMENT IN WATCHES.

Specification forming part of Letters Patent No. 204,000, dated May 21, 1878; application filed November 28, 1877.

*To all whom it may concern:*

Be it known that I, D. AZRO A. BUCK, of Worcester, in the county of Worcester, and in the State of Massachusetts, have invented certain new and useful Improvements in Watches; and do hereby declare that the following is a full, clear, and exact description thereof, reference being had to the accompanying drawings, making a part of this specification, in which—

Figure 1:
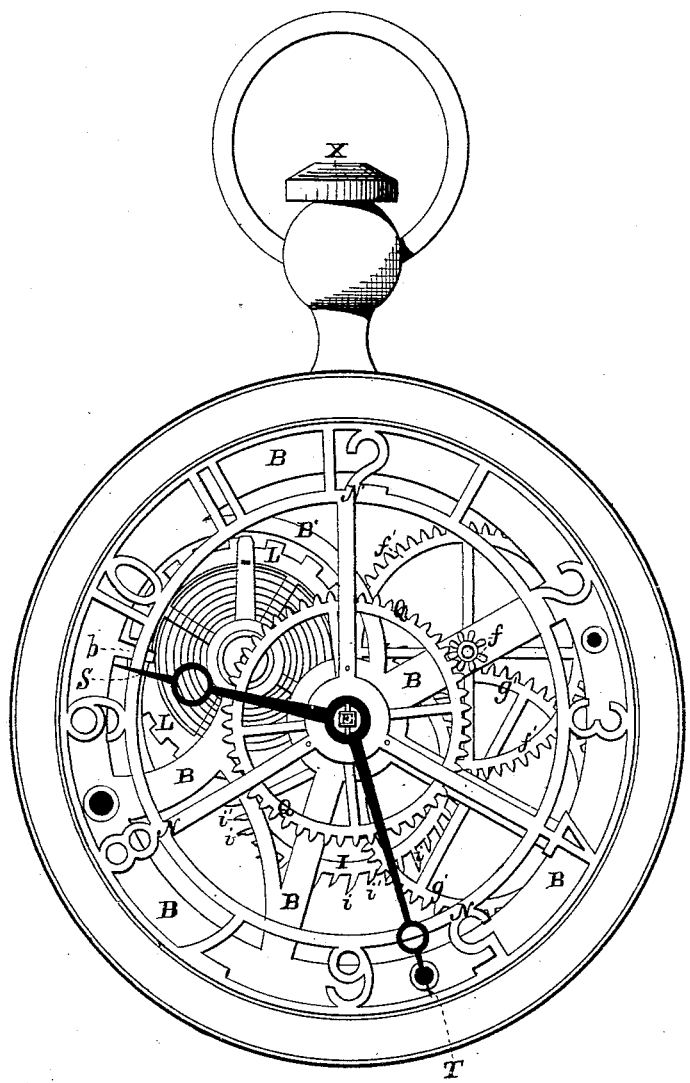
Figure 2:
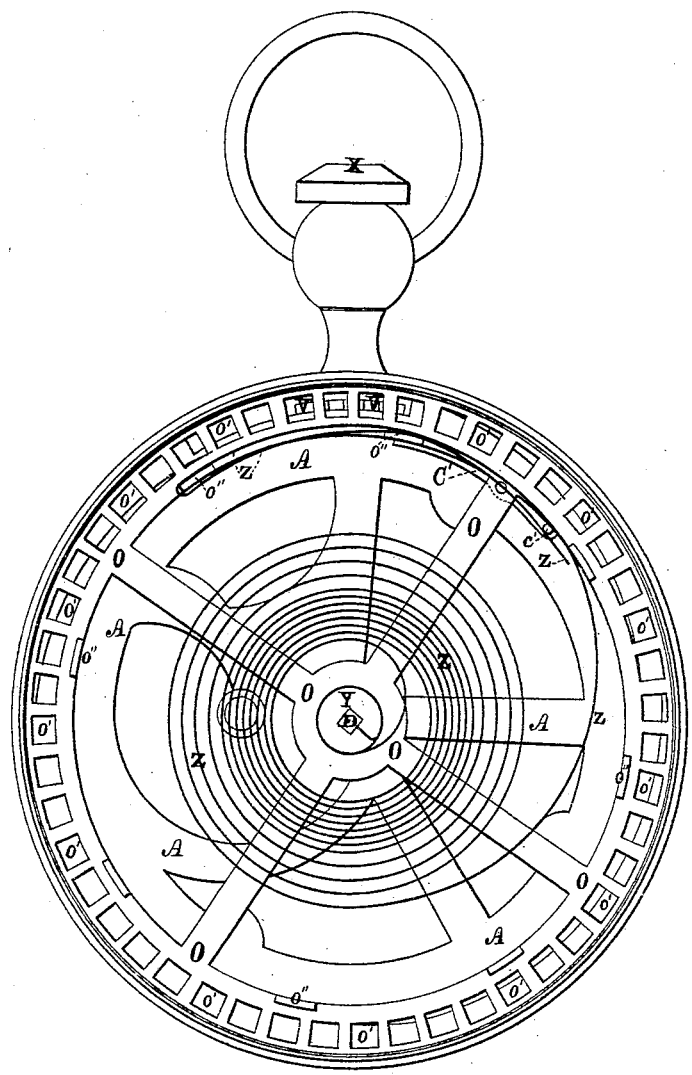
Figure 3:
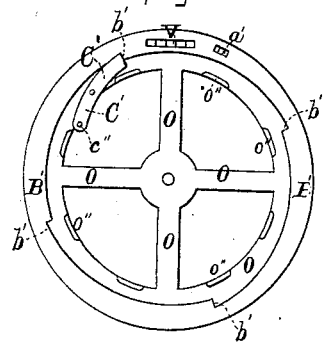
Figure 4:
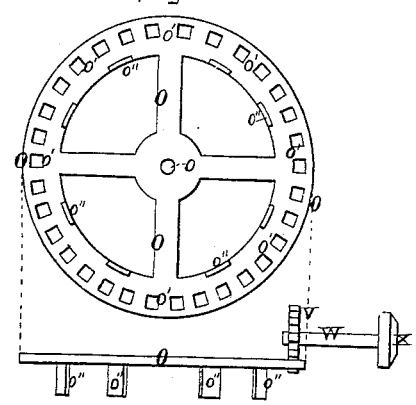
Figure 5:
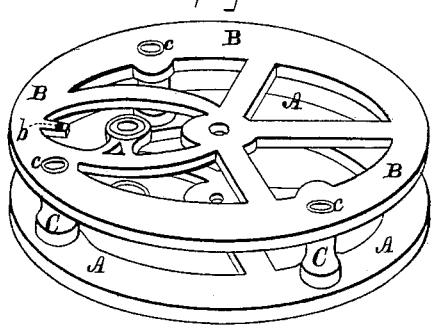
Figure 6:
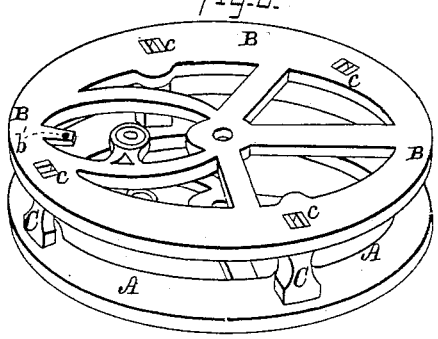
Figure 7:
Figure 8:
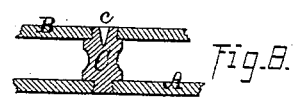
Figure 9:
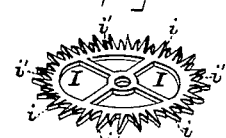
Figure 11:
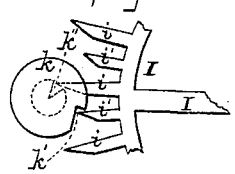
Figure 10:
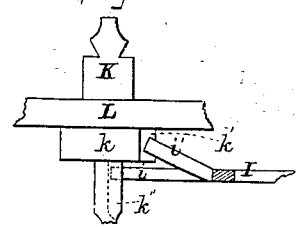

Figure 1 is a plan view of the upper side of my watch. Fig. 2 is a like view of the lower side of the same, the case-back and cap being removed. Figs. 3 and 4 are, respectively, plan views of the upper and lower sides of the spring-wheel and its stop mechanism. Figs. 5 and 6 are perspective views of the upper side of the frame of the train, and show different methods for confining the top plate in position upon the pillars. Figs. 7 and 8 are, respectively, vertical sections of one of the pillars of said Figs. 5 and 6. Fig. 9 is a perspective view of the escape-wheel. Fig. 10 is a side elevation of the balance arbor or staff, and shows the escape-wheel in vertical section. Fig. 11 is a plan view of said parts from the upper side. Fig. 12 is a central cross-section of the watch upon a line passing through the stem. Fig. 13 is an enlarged cross-section of the dial and stationary dial-wheel. Fig. 14 is a like view of the top plate, dial, dial-wheels, and hands. Fig. 15 is an enlarged elevation of the inner side of the spring pawl or detent for engagement with the spring-wheels; and Fig. 16 is a vertical section of one of the pivot-bearings or openings of the top plate, showing the means employed for securing the caps in place.

Letters of like name and kind refer to like parts in each of the figures.

The design of my invention is, mainly, to simplify the construction of a watch, so as to enable it to be constructed at a much less expense than has heretofore been practicable; to which end it consists, principally, in the peculiar construction of the combined spring wheel and barrel, substantially as and for the purpose hereinafter shown.

It consists, further, in combining the stem, thumb-piece, and stem-wheel with each other and with the case, substantially as and for the purpose hereinafter set forth.

It consists, further, in the cap for confining the mainspring and its wheel in position within the case, substantially as is hereinafter shown and described.

It consists, further, in the means employed for preventing backward rotation of the spring-wheel, consisting of a spring-pawl pivoted upon the winding-stem, between the stem-wheel and the inner face of the case-center, substantially as and for the purpose hereinafter specified.

It consists, further, in the means employed for releasing the spring-pawl from engagement with the spring-wheel, substantially as and for the purpose hereinafter shown.

It consists, further, in the stop mechanism for limiting the coiling of the mainspring when such mechanism is actuated by such mainspring, substantially as is hereinafter set forth.

It consists, further, in a pivotal arbor for the upper end of the rotating movement, which is connected with the upper plate by a friction-bearing, and forms a pivotal support for the minute-hand, substantially as and for the purpose hereinafter set forth.

It consists, further, in the means employed for imparting the desired motion to the hour-hand, consisting of an hour-hand wheel pivoted below a fixed wheel that has a less number of peripheral teeth, and caused to mesh with a pinion which engages with and rotates around both of said wheels, substantially as and for the purpose hereinafter shown and described.

It consists, further, in producing a friction-bearing of the hour-hand upon its supporting-arbor by interposing a concave steel washer between the hub of said hand and the upper riveted end of said arbor, substantially as and for the purpose hereinafter shown.

It consists, further, in an open dial formed by removing the material around the figures or characters, substantially as and for the purpose hereinafter set forth.

It consists, further, in securing the dial within the case by placing the former within a rabbet that is formed within the inner upper corner of the center-piece, and then burnishing the contiguous metal inward and downward over the edge of said dial, substantially as and for the purpose hereinafter shown and described.

It consists, further, in the means employed for connecting the center-wheel to or with the dial, consisting of an intermediate washer provided with a hollow hub, which projects through said parts and is riveted or headed down upon each, substantially as and for the purpose hereinafter specified.

It consists, further, in providing within the lower inner corner of the center-piece of the case a groove or rabbet for containing the toothed ring, spring-wheel, and cap, substantially as and for the purpose hereinafter set forth.

It consists, further, in a watch in which the center-piece of the case operates to support the parts of the movement to connect the same together and to confine them in place, substantially as and for the purpose hereinafter shown and described.

It consists, finally, in the means employed for supporting the pivotal arbors, upon and around which the movement rotates, consisting of the dial permanently secured within one side of the case-center, and the spring-wheel confined in position within the opposite side of the same, and each provided at its center with an opening for the reception of one of said arbors, substantially as and for the purpose hereinafter specified.

In the annexed drawings, A represents the lower and B the upper plate of my watch-movement, which are connected together by means of three or more pillars, C, that are permanently secured within said lower plate A, and have their upper reduced ends $c$ contained within corresponding openings in said upper plate B, the arrangement being such as to cause said plates to maintain the relative position shown in Figs 5 and 6, their inner faces being parallel, and their pivot-openings coincident with each other.

In order that the upper plate B may be held securely in position upon the pillars C, the reduced ends $c$ of the latter are either made cylindrical and provided with a round axial opening, into which, when said plate is in position, a round tapering steel mandrel is driven, so as to spread said ends, as seen in Fig. 5, or the latter are made square and split, as shown in Fig. 6, so as to permit of their lateral expansion by means of a wedge-shaped tool driven into the opening of each.

At the center of the bottom or pillar plate A is rigidly secured an arbor, D, which extends outward to a suitable distance, and at its end is squared or otherwise prepared for the reception of a spring-collet, $d$, while at the center of the upper plate B is an arbor, E, which is reduced in diameter at its lower end, and has such reduced portion $e$ contained within a corresponding opening in said plate.

In order that the arbor E may be revolved within the plate B when desired, its lower end $e$ is loosely fitted within the latter, and over said end, below said plate, is placed a round concave steel washer, $e'$, with its concave side upward, after which said end is headed, so as to cause said washer to bear firmly against said plate, when it will be found that the spring of said washer will produce sufficient friction between its upper side and said plate B, and between the latter and the shoulder, which forms the upper end of said reduced portion $e$, to cause said arbor to rotate with the plates A and B, unless a considerable force is exerted to move it in an opposite direction.

At one side of the center of the plates A and B is pivoted an arbor, F, which, at its upper end, projects through said plate B, and to said end has secured a pinion, $f$, while at a point just below said plate B is secured a toothed wheel, $f'$.

A second arbor, G, is pivoted at one side of the arbor F and at about the same distance from the center of the plates A and B, and at its upper end is provided with a pinion, $g$, that meshes with the toothed wheel $f'$, while near its longitudinal center said arbor has secured a toothed wheel, $g'$, that has substantially the size of said wheel $f'$.

Near the center of the plates A and B is pivoted an arbor, H, which, at or near its longitudinal center, is provided with a pinion, $h$, that meshes with the toothed wheel $g'$, while below said pinion is secured an escape-wheel, I, which, around its periphery, has a series of longitudinal pointed teeth, $i$, that incline slightly forward, while between each of said teeth is provided another, similar but shorter, tooth, $i'$, that extends upward at an angle of about ten degrees from the face of said wheel.

The teeth of the escape-wheel are cut in the usual manner, after which one set, preferably the short teeth $i'$, are bent upward, so as to bring their ends into a different plane from that occupied by the long teeth $i$.

While the arrangement named is deemed most desirable, the long teeth may be bent upward and the short teeth permitted to maintain their original positions; or one set of teeth may be bent upward and the other set bent downward, the only object of such change being to cause said teeth to occupy different planes, as before stated.

Near the periphery of the escape-wheel I, upon the side of the center of the plates A and B opposite to the arbor G, is pivoted an arbor or staff, K, to which, at a point above said escape-wheel, is secured a balance-wheel, L, that is stamped out of sheet metal, and around its periphery is provided with a series of radial projections, $l$, that form a part of said balance, and in dimensions resemble the screws of an expansion-balance.

Upon the staff K, immediately below the balance L, upon the same plane as that occupied by the short teeth $i'$, is provided a collar, $k$, which has such diameter as to cause its periphery to extend within the circle described by the ends of said teeth, and within said collar is formed a notch, $k'$, that, in horizontal section, has the form of a right angle, and is arranged, as seen in Fig. 11, with its forward side in a line with the radius, in which position one of said short teeth $i'$, may enter said notch until its forward face, at its end, bears against the forward side of the latter.

The location of the staff K with relation to the arbor H is such as to cause about one-half its diameter below the collar $k$ to be within the circle described by the ends of the long teeth $i$, and within such part of said staff is formed a V-shaped notch, $k''$, that is located about one-fourth the circumference of said staff in advance of said notch $k'$.

As thus arranged, the operation of the escapement is as follows: When the balance is revolving backward, one of the long or locking teeth $i$ bears against the staff K and prevents motion of the escape-wheel I; but as said balance-wheel revolves in an opposite or forward direction, said tooth $i$ drops into the notch $k''$ and moves forward until the succeeding tooth $i$, in turn, bears upon said staff and again arrests the movement of said escape-wheel. While the locking-tooth $i$ is passing through the notch $k''$ the short impulse-tooth $i'$ immediately in its rear passes into its notch $k'$, and, bearing against the forward side of the latter, gives impulse to the balance, its engagement with said notch ceasing just before the next locking-tooth impinges upon the shaft K.

If desired, the notch $k'$ may be omitted, and in its stead a pin or stud be placed in the upper side of the collar $k$, in which event said collar must be arranged so as to permit the impulse-teeth $i'$ to pass freely above it.

End motion of the staff K and arbors H and F is prevented by means of steel caps M, which are circular in form, and are placed within corresponding recesses formed in the plates A and B at the end of each pivot-hole, where they are secured in place by swaging or burnishing the contiguous metal of said plates over the edges of said caps. Holes for the insertion of oil within the pivot-holes are formed at one side of the center of each cap.

The plates A and B, which are formed by dies, have all surplus metal removed from their central portions, a sufficient quantity only being left to insure the necessary strength and cause the operative mechanism to be properly supported.

The portion of each plate which forms a bearing for the balance-wheel staff K is so connected with said plate as to enable it to be bent toward or from the escape-wheel, by which means the depth of engagement of the escapement may be varied at will.

The hair-spring attachment or stud $b$ forms part of the upper plate B, and after the latter is stamped out is bent downward until its end is in position to receive the end of the hair-spring, such construction effecting an important saving in expense over the usual method of forming such stud separately and attaching it to the plate by one or more screws and dowel-pins.

The parts described, which constitute the train of my watch, are pivoted or journaled by means of the arbors D and E within a dial, N, and spring-wheel O in such manner as to permit of their rotation.

The dial N is preferably composed wholly of metal, and is stamped or cut by dies from a plate which has sufficient thickness to afford the necessary strength. The metal around the figures of said dial is cut away, as is also most of the central portion of the same, so as to leave said figures disconnected, except at their outer and inner ends, and to expose as much of the interior of the watch as is possible, while reserving sufficient metal to afford the necessary strength to support the operative mechanism.

The dial N is secured in position within the case by being fitted at its edge into a rabbet, $p$, that is formed within the upper inner edge of the center-piece P, after which the contiguous metal of the latter is burnished or spun over the face of said dial, firmly locking the same in position, and preventing rotary motion or accidental displacement.

At the center of the dial N, upon its lower side, is a toothed wheel, Q, which is permanently secured in place by means of a washer, $q$, that is placed between said parts, and is provided at each side with a hub, $q'$, that passes through a corresponding opening in said dial or wheel, and has its projecting ends riveted or headed down, such arrangement causing the parallelism of the contiguous faces of said parts to be maintained, and said wheel, at its rim, to be slightly below said dial.

The washer $q$ is provided with an axial opening, through which passes the hollow arbor $r$ of the hour-hand wheel R, said wheel being immediately below the wheel Q, while said hollow arbor extends above the dial N sufficiently to enable it to receive the hour-hand S. Said hour-hand is permanently connected with said hollow arbor by having the end of the latter riveted or burnished downward over its hub.

In order that the hour-hand S may be rotated upon the hollow arbor $r$ for the purpose of setting the watch, a concave steel washer, $r'$, is placed around the end of said arbor, above said hand, before the end of the former is headed downward, the concave side of said washer being downward, when it is found that the pressure exerted by the latter will produce sufficient friction between its lower surface and the upper side of the hub of said hand, and between the lower side of the latter and the shoulder upon which it rests, to cause said hand to rotate with said hollow arbor, except when purposely moved thereon. From its upper end downward nearly to the plate B the arbor E is reduced in diameter, so as to permit it to pass freely through the hollow arbor, which latter forms a bearing for the former.

The shoulder which forms the lower end of the reduced portion of the arbor E bears against the lower side of the hub of the wheel R, while the upper end of said arbor extends sufficiently through the hollow arbor $r$ to permit of the attachment thereto of a minute-hand, T, by any desired means.

The diameters of the wheels Q and R are the same, so that each meshes with the pinion $f$; but said wheels have different numbers of teeth, the stationary wheel Q having forty-four and the movable wheel R forty-eight teeth; but, if desired, a larger or lesser number may be employed, provided that the relative proportion is maintained.

By this arrangement each rotation of the pivoted movement will cause the minute-hand to pass entirely around the dial, while the hour-hand will be carried forward one-twelfth of a revolution as its wheel R is moved forward by the rotation of the pinion around the same, said pinion engaging with but forty-four of the forty-eight teeth of said wheel, eleven-twelfths of its periphery, in traveling around the same, and, consequently, having moved said wheel forward just four teeth.

The spring-wheel O has substantially the same diameter as the dial N, and is contained within a rabbet, $p'$, that is formed within the lower inner edge of the case-center P, where it is held in place, while permitted to rotate, by means of a cap, U, which fits at its edges into said rabbet with sufficient closeness to cause it to maintain its position, unless purposely removed therefrom.

The spring-wheel O is provided with a central opening, $o$, which receives and contains the arbor D and forms a bearing for the same, while immediately within the outer edge of said wheel are formed a series of rectangular openings, $o'$, that are arranged radially and at equidistant points around the same, and receive the teeth of a spur-wheel, V, which wheel is secured to or upon the inner end of the stem W, and engages with said spring-wheel from its upper side.

The stem W, stem-wheel V, and a thumb-piece, X, placed around the outer end of the former, are permanently secured together by riveting or heading down the ends of said stem after the parts are in place within the case.

The spring-wheel O has its central portions cut away, so as to leave a rim, hub, and spokes, and from equidistant points of the inner edge of such rim a number of lugs, $o''$, project downward, as shown in Fig. 4. Said wheel, including its lugs, is cut with a die from one piece of metal, and said lugs afterward bent downward to position.

Upon the outer end of the arbor D is secured a collet, Y, which receives the inner end of a mainspring, Z, the outer end of which spring is doubled backward around one of the lugs $o''$, and said spring, together with the backward double end, thence passes outside of the next lug, and thence continues inward toward the center.

The spring-wheel O is prevented from rotating backward by means of a spring pawl or detent, A', (shown in Fig. 15,) which, near its longitudinal center, is provided with an opening that enables it to be placed over the stem W, between the stem-wheel V and case-center P, in which position said stem operates as a pivotal bearing for said pawl.

The rear portion of the pawl A' is made thin vertically, so as to form a spring, and has its end pressed against a suitable bearing that is placed immediately above the spring-wheel O, while the front end of said pawl is pointed and turned downward and forward, and engages with the openings $o'$ of said spring-wheel.

As thus arranged, the pawl A' will oscillate upon its pivotal bearing, the stem W, whenever the spring-wheel O is moved in a forward direction, the front end of said pawl being alternately depressed and allowed to spring outward as each opening $o'$ passes over the same; but in consequence of the shape of said engaging end said wheel cannot be rotated rearward while each part remains intact.

In order that the pawl A' may be released from engagement with the spring-wheel O whenever it is desired to let down the spring, a lug, $a'$, is formed upon the upper side, in rear of the pivotal bearing of said pawl, and projects upward through a suitable notch in the dial N, in which position a slight rearward pressure upon said lug will cause the engaging end of said pawl to be moved upward out of engagement with said spring-wheel.

To prevent breakage of the mainspring or injury to other parts of the watch by the too close winding of said spring, the following-described means are employed: Immediately above the spring-wheel O, within the rabbet $p'$, is placed a ring, B', which has about one-half the width of the rim of said wheel, is held in circumferential position by any suitable means, and upon or within its inner periphery is provided with a series of notches, $b'$, that have the form shown in Fig. 3, and each inclines outward and forward in the line of motion of said spring-wheel. Upon the upper face of the spring-wheel O, within the line of the inner edge of the ring B', is pivoted a pawl, C', which may be turned until its forward end engages with one of the notches $b'$ of said ring and arrests further forward motion of said wheel; or said pawl may be turned so as to release its said end from engagement, and permit said spring-wheel to rotate without interruption. From the lower side, at the rear end of the pawl C', a stud, $c''$, extends downward between the rearward-bent end of the mainspring Z and the outer coil of the same, in such position as to cause the said end to bear upon and press said stud and the rear end of said pawl outward. As thus arranged, the outward pressure of the end of the mainspring Z will cause the pawl C' to remain out of engagement with the toothed ring B' until said spring has been nearly coiled up, when the outside coil of the latter, drawing diagonally inward across the stud c'', will exert sufficient force to overcome the resistance of said spring end, and will cause said pawl to engage with said toothed ring and the forward motion of the spring-wheel to be arrested.

The inventions shown in the escapement, the balance-wheel, and the movement-plates are not claimed herein, said inventions being the subject of separate applications for patent.

Having thus fully set forth the nature and merits of my invention, what I claim as new is—

1. The spring-wheel O cut from sheet metal, and provided near its periphery with radial openings o', which are parallel with the axis of said wheel and receive the teeth of a spur-gear wheel, substantially as and for the purpose shown.

2. The spring-wheel O having at the inner edge of its rim a number of lugs, o'', which are attached to and form part of said rim, and are bent downward at a right angle to the plane of said wheel, substantially as and for the purpose set forth.

3. The cap U arranged to fit within the rabbet p' of the case-center P, and to embrace the spring-wheel O and spring Z, substantially as and for the purpose shown and described.

4. In combination with the spring-wheel O, the pawl A', provided at one end with a point which engages with said wheel, and at its opposite end with a spring, and pivoted upon the stem W between the winding-wheel V and the case-center P, substantially as and for the purpose specified.

5. As a means for releasing the pawl A' from engagement with the spring-wheel O, the lug a' formed upon the upper side of said pawl, in rear of its pivotal bearing, and projecting upward through the dial N, substantially as and for the purpose shown.

6. Stop mechanism for limiting the coiling of the mainspring when such mechanism is actuated by said spring, substantially as and for the purpose set forth.

7. In a watch-movement having its train arranged to rotate upon or around a center, a pivotal arbor for the upper end of the same, which forms a pivotal support for the minute-hand, and is connected to or with the upper plate of the frame of said train by means of a friction-bearing, substantially as and for the purpose set forth.

8. As a means for imparting motion to the hour-hand S, the toothed wheel Q, secured to or upon the dial N, the toothed wheel R, having a less number of teeth than said wheel Q, and provided with the arbor r, which passes through said wheel Q and receives and supports said hand, and the pinion f, forming part of the train of the watch, and arranged to mesh with and rotate around said wheels, substantially as and for the purpose shown and described.

9. As a means for producing a friction-bearing of the hour-hand S upon its supporting-arbor r, a concave steel washer, r', interposed between the hub of said hand and the upper riveted end of said arbor, substantially as and for the purpose shown.

10. An open watch-dial, formed by removing the material around the figures, substantially as and for the purpose set forth.

11. A watch in which the dial is secured within the case by placing said dial within a rabbet that is formed within the upper edge of the center-piece, and burnishing the contiguous metal inward and downward over the edge of said dial, substantially as and for the purpose shown and described.

12. As a means for connecting the center-wheel Q to or with the dial N, the washer q, placed between said parts, and provided with a hollow hub, q', which projects through said parts, and is riveted or headed down upon each, substantially as and for the purpose specified.

13. As a means for containing and securing in position the toothed ring B', spring-wheel O, and cap U, the rabbet p' formed within the inner lower corner of the center-piece P, substantially as set forth.

14. A watch in which the center-piece of the case operates to support the parts of the movement, to connect the same together, and to confine them in place, substantially as and for the purpose shown and described.

15. As a means for supporting the pivotal arbor D and E of the movement, the dial N, permanently secured within one side of the case-center P, and the spring-wheel O, confined in position within the opposite side of the latter, and each provided with a central opening for the reception of one of said arbors, substantially as and for the purpose specified.

In testimony that I claim the foregoing I have hereunto set my hand this 10th day of November, 1877.

D. AZRO A. BUCK.

Witnesses:
 GEO. S. PRINDLE,
 WILLIAM FITCH.